Aug. 30, 1966 J. MANASTER 3,269,302
DEBONED POULTRY MEAT TREATING APPARATUS
Filed July 20, 1964
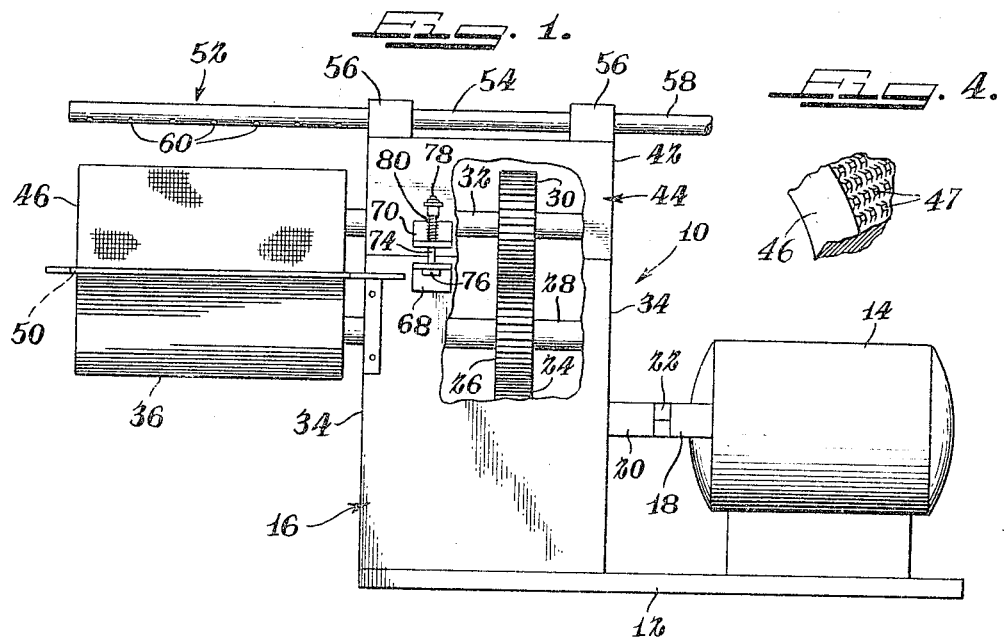
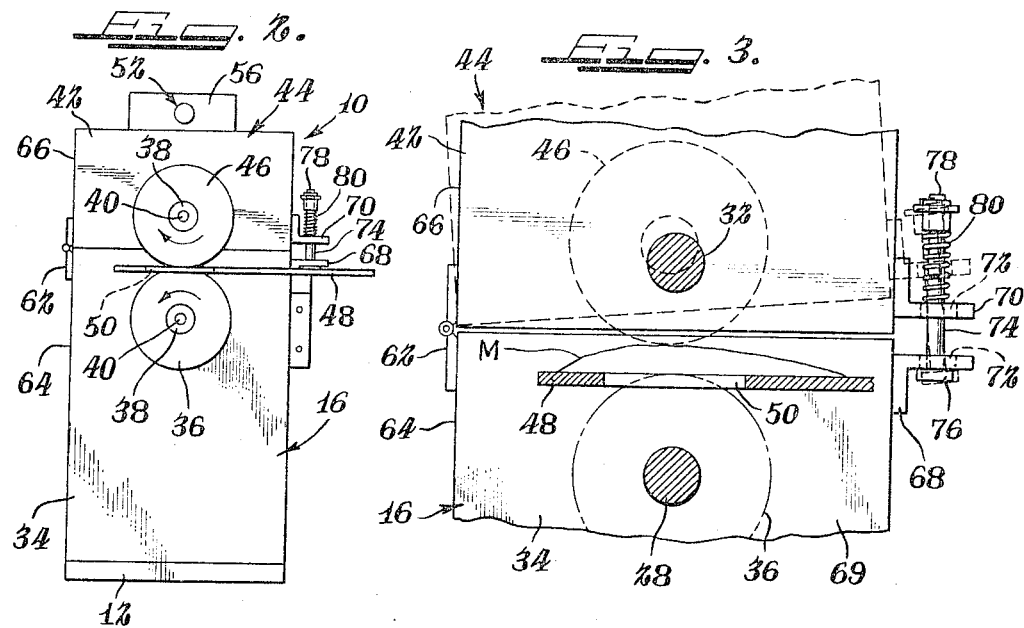
INVENTOR.
JOSEPH MANASTER
BY Bair, Freeman
& Molinare Attys.

United States Patent Office 3,269,302
Patented August 30, 1966

3,269,302
DEBONED POULTRY MEAT TREATING APPARATUS
Joseph Manaster, 1238 W. George St., Chicago, Ill.
Filed July 20, 1964, Ser. No. 383,704
3 Claims. (Cl. 100—73)

This invention relates to poultry treating apparatus and it particularly relates to apparatus useful for flattening or causing the spreading of deboned poultry meat, such as chicken legs and breasts.

In the preparation of various gourmet type foods utilizing poultry meat, it is common for the meat to be first deboned. As a specific example, in preparing certain chicken dishes, a chicken leg or breast is deboned, filled with a stuffing, and then the chicken meat is actually folded around the stuffing so as to substantially enclose it within the meat. The step of substantially enclosing the stuffing requires that the chicken leg or breast meat be flattened or spread out so that the outer edges of the meat may be folded around the stuffing. It has been the practice for an operator to utilize a hand mallet, ordinarily having a scored surface, for striking the deboned chicken meat and effecting a flattening or spreading thereof. However, such hand operations are quite time consuming and excessively expensive.

In order to avoid this waste of time and money, it would be highly desirable to provide mechanical equipment which would substantially eliminate the discussed hand operations. One type of apparatus which could conceivably be used for effecting the flattening of deboned chicken meats are various known types of meat tenderizing or cubing devices. However, no known meat tenderizing machines are satisfactory for use in connection with poultry, and particularly with deboned chicken legs and breasts, because this known equipment is designed for use with meat which is of substantially uniform thickness, both as to an individual piece and among a plurality of pieces, while deboned chicken legs or breasts have widely varying thicknesses, both as to an individual piece and among a plurality of pieces. In this regard known meat tenderizing equipment uses two cooperating roller members, between which the meat is passed. However, since the red meat is of substantially consistent thickness, such roller members rotate only in a fixed position with a fixed gap therebetween. As a result, if, for example, deboned chicken legs or breasts are passed between such roller pairs, the fixed spacing between the rollers of a pair will cause the thin parts of the leg or breast to be unaffected by the rolling operation, while the thick parts of the leg or breast meat will become excessively compressed with possible damage to the meat.

Therefore, it is an important object of this invention to provide improved meat rolling apparatus which is particularly useful for flattening or spreading poultry meat having widely varying thicknesses.

It is also an object of this invention to provide improved poultry treating apparatus wherein deboned chicken breasts or legs of widely varying thicknesses are flattened or spread by being compressed between a pair of rollers without damage being done to the thick portions thereof.

It is a further object of this invention to provide improved poultry treating apparatus wherein deboned chicken breasts or legs are passed between a pair of cooperating roller members which are resiliently mounted with respect to each other, whereby substantially constant compression forces are imparted to each of the chicken legs or breasts being flattened or spread out.

It is another object of this invention to provide poultry treating apparatus wherein the apparatus is characterized by its simplicity and economy of construction and operation.

Further purposes and objects of this invention will appear as the specification proceeds.

A particular embodiment of the present invention is illustrated in the accompanying drawings wherein:

FIGURE 1 is a front elevational view of my improved poultry treating apparatus wherein the housing for the driving gears of the apparatus is partially broken away;

FIGURE 2 is an end elevational view of the embodiment of FIGURE 1;

FIGURE 3 is an enlarged end elevational view showing the resilient mounting provided between the upper and lower rollers of my improved poultry treating apparatus; and FIGURE 4 is an enlarged perspective view of a portion of the upper roller of my poultry treating apparatus.

With reference to the drawings, my poultry treating apparatus, generally 10, is mounted on a foundation or base 12. An electric motor 14 is mounted on the base 12 and is operatively connected to gear reduction means positioned within a gear box or lower housing 16. The motor shaft 18 is operatively connected to the shaft 20 of the gear reduction means by a coupling member 22.

The gear box 16, which is securely mounted on the base 12, encloses the gear reduction apparatus, one gear 24 thereof being shown in FIGURE 1. The gear 24 meshes with a gear 26 which is secured on the lower roller shaft 28. The lower gear 26, in turn, meshes with a gear 30 which is secured to the upper roller shaft 32. Thus, upon operation of the motor 18, through the gear reduction means, the gear 24 imparts rotation, at the desired speed, to the gear 26 and to lower shaft 28 and the gear 26, in turn, rotates the gear 30 and the upper shaft 32. The shafts 28 and 32 are thus rotated in opposite directions so that both rollers 36 and 46 act to pull meat therebetween; referring to FIGURE 2, the upper shaft 32, for example, is rotated in a clockwise direction, while the lower shaft 28 rotates in a counterclockwise direction.

The lower roller shaft 28 is rotatably mounted in suitable bearings (not shown) mounted in the opposite side walls 34 of the stationary housing or gear box 16. The lower roller 36 is spaced laterally of the housing 16 and is keyed to the lower roller shaft 28 and is secured thereto by means of a flange 38 which bears against an outer portion of the roller member 36; a screw 40 is passed through the flange 38 and is threaded into the outer end of the lower shaft 28 for maintaining the roller in securement thereon.

The upper roller shaft 32 is rotatably mounted in bearings (not shown) carried in the opposite side walls 42 of a movable upper housing member 44. The upper roller member 46 is spaced laterally of the housing 16 and is keyed to the upper shaft 32, in a manner similar to the connection between the roller 36 and the shaft 28, and is maintained in securement thereto by an outer flange 38 and screw 40, which is passed through the flange 38 and is threaded into the outer end of the upper shaft 32.

In passing poultry meat between the rollers, the meat is initially placed on an apron 48 which is secured to the gear box 16. The apron 48 is normally in a substantially horizontal position and is aligned with the gap between the normally vertically aligned roller members 36 and 46. A rectangular aperture 50, provided in the apron 48, is substantially co-extensive with the area at which the outer peripheries of the rollers 36 and 46 are in close proximity. The aperture 50 permits the meat to contact both rollers while passing therebetween, whereby the meat becomes flattened or spread out. As the meat contacts the outer peripheries of the rollers, it is actually pulled therebetween by the action of the rollers themselves, which include gripping means on their outer peripheries. In this regard, the roller 36 is provided with longitudinal slots on its outer periphery and the upper roller 46 is knurled on its outer periphery. The individual knurls 47 have the general configuration of truncated pyramids.

It is desirable to wash the deboned chicken meat as it is passed between the rollers 36 and 46 while at the same time effecting lubrication of the meat passing therebetween. For this purpose, a water applicator 52 is provided and is mounted on the upper wall of the movable housing member 44 and extends outwardly and is positioned directly over the upper roller 46. The applicator 52 includes a manifold 54 which is carried by brackets 56 which are secured to the upper surface of the housing 44. Water is supplied to the manifold 54 through a flexible water supply conduit 58. The portion of the manifold 54 which is positioned over the upper roller 56 includes a plurality of downwardly opening apertures 60, through which water is passed and drips on the rotating outer periphery of the upper roller 46, so that the meat is washed and lubricated as it is being passed between the rollers, while the rollers, and particularly the upper roller 56, are being simultaneously rinsed.

In my invention, it is important that the upper roller 46 be resiliently mounted with respect to the lower roller 36. This resilient mounting includes a hinge member 62 which has one of its hinge plates secured to the rear wall 64 of the fixed lower housing 16 and the other of its hinge plates is fixed to the rear wall 66 of the housing member 44, to thereby provide for pivotable mounting of the upper housing 44. In order to provide the desired substantially constant flattening pressure against the meat being passed between the rollers, the pivotable upper housing 44 is biased towards the fixed lower housing 16. A bracket 68 is secured to the upper portion of the front wall 69 of the lower housing 16 and a similar bracket 70 is secured to the lower portion of the front wall 71 of the pivotable housing 44. The brackets 68 and 70 are in substantial alignment and include aligned apertures 72 which are provided for receiving a stud member 74 having a threaded upper end. The stud 74 also includes an enlarged head 76 which acts as a stop by bearing against the lower surface of the bracket 68, thereby preventing the stud from passing through the apertures 72. The threaded end of the stud 74 is adapted to receive a nut 78. A compression spring 80 is mounted around the stud, which acts as a guide therefor, and is compressed between the upper surface of the bracket 70 on the housing 44 and the lower end of the nut 78, whereby the spring 80 causes the housing 44 to be normally biased toward the gear box 16, which at the same time causes the upper roller 46 to be biased toward the lower member 36.

The compression force of the spring 80 is adjusted simply by threadedly moving the nut 78 up and down on the stud 74. By making the desired spring adjustment, the upper roller 46 will be biased toward the lower roller 36 with a pressure which will impart substantially constant compression forces to the poultry meat regardless of the variability in thickness thereof. The biasing apparatus also serves a second function since the pivotable upper housing 44, which rotatably carries the upper shaft 32, is prevented from moving excessively far from the lower housing 16, which rotatably carries the shaft 28. By serving this function, the teeth of the meshing gears 26 and 30 will always be maintained in meshing relationship, despite up and down movement therebetween, in response to the passage of variable thickness meat therethrough.

As seen in FIGURE 3, since the upper housing is pivotable, the stud 74 has a substantially narrower shaft than the aperture 72 in the lower bracket 68, in order that it may be tipped inwardly with respect thereto. In FIGURE 3, there is also a showing, in hidden view, of chicken meat M passing skin side down between the rollers 36 and 46. The upper roller 46 is moved upwardly by the meat M and the biasing action of the spring 80 imparts substantially constant compression forces against the meat regardless of the variable thickness thereof.

While in the foregoing, there has been provided a detailed description of a particular embodiment of the present invention, it is to be understood that all equivalents obvious to those having skill in the art are to be included within the scope of the invention as claimed.

What I claim and desire to secure by Letters Patent is:

1. Poultry treating apparatus for flattening and spreading out variable thickness deboned poultry meat, said apparatus comprising a fixed housing, a first elongated roller member rotatably carried by and outwardly of said fixed housing so as to be supported at only one end, a movable housing carried by said fixed housing, a second elongated roller member rotatably carried by and outwardly of said movable housing so as to be supported at only one end and having its outer periphery spaced from but adjacent the outer periphery of said first roller member, meshing drive means positioned in said housings for imparting the same peripheral rotational speed to said roller members, said first and second roller members cooperating to receive and cause the substantial flattening and spreading out of said poultry meat, a support apron carried by and outwardly of said fixed housing so as to be supported at only one end and so as to be in a substantially horizontal position and aligned with the space between said spaced rollers members, the support apron defining an aperture therein substantially coextensive with the area in which the outer peripheries of the rollers are in close proximity whereby the said aperture permits meat on the support apron to be contacted by both rollers while passing therebetween, the apron serving as a support for the meat prior to passage between the rollers and for the flattened and spread out meat after passing between the rollers, and means for biasing said movable housing towards said fixed housing whereby substantially constant compression forces are imparted to said poultry meat regardless of the varying thicknesses thereof.

2. A device as in claim 1 wherein the first roller member is longitudinally slotted in its periphery and the second roller member is knurled to provide truncated pyramids in its periphery.

3. A device as in claim 1 wherein the second roller member is in substantial vertical alignment with the first roller member, and a water applicator is carried by and outwardly of said movable support and is positioned directly over the second roller member in spaced relation thereto for dripping water vertically downwardly onto the second roller member for cleaning the roller and lubricating the passage of the poultry meat between the roller members.

References Cited by the Examiner
UNITED STATES PATENTS

| | | | |
|---|---|---|---|
| 912,592 | 2/1909 | Miller | 68—202 |
| 1,059,879 | 4/1913 | Kennedy | 100—271 X |
| 1,572,002 | 2/1926 | Dremel | 68—274 X |
| 1,600,002 | 9/1926 | Kingery | 17—26 |
| 2,066,245 | 12/1936 | Bauman | 221—60 |
| 2,302,566 | 11/1942 | Minkow | 100—171 X |
| 2,597,569 | 5/1952 | Cooper | 68—245 X |
| 2,776,510 | 1/1957 | Klopfenstein | 100—93 |

LOUIS O. MAASSEL, *Primary Examiner.*

WALTER A. SCHEEL, *Examiner.*